United States Patent
Li et al.

(10) Patent No.: US 10,527,761 B2
(45) Date of Patent: Jan. 7, 2020

(54) GRAPHENE COATED OPTICAL ELEMENTS

(71) Applicant: The Boeing Company, Seal Beach, CA (US)

(72) Inventors: Angela W Li, Everett, WA (US); Jeffrey H Hunt, Thousand Oaks, CA (US); Wayne R. Howe, Irvine, CA (US)

(73) Assignee: The Boeing Company, Chicago, IL (US)

( * ) Notice: Subject to any disclaimer, the term of this patent is extended or adjusted under 35 U.S.C. 154(b) by 776 days.

(21) Appl. No.: 13/740,967

(22) Filed: Jan. 14, 2013

(65) Prior Publication Data

US 2014/0199542 A1    Jul. 17, 2014

(51) Int. Cl.
*G02B 1/12*        (2006.01)
*G02B 1/14*        (2015.01)

(52) U.S. Cl.
CPC ............... *G02B 1/12* (2013.01); *G02B 1/14* (2015.01); *Y10T 428/265* (2015.01)

(58) Field of Classification Search
None
See application file for complete search history.

(56) References Cited

U.S. PATENT DOCUMENTS

| | | | |
|---|---|---|---|
| 2003/0124717 A1* | 7/2003 | Awano .................. | B82Y 30/00 435/287.2 |
| 2006/0018018 A1* | 1/2006 | Nomura ................ | B82Y 20/00 359/487.02 |
| 2010/0028960 A1* | 2/2010 | Davis et al. ................ | 435/131 |
| 2010/0255984 A1 | 10/2010 | Sutter et al. | |
| 2011/0240111 A1* | 10/2011 | Yamazaki et al. ........... | 136/256 |

FOREIGN PATENT DOCUMENTS

| EP | 1 445 647 A1 | 8/2004 |
|---|---|---|
| KR | 2013 0001705 A | 1/2013 |

OTHER PUBLICATIONS

Carbon nanotubes, (accessed May 2015) <http://www2.physics.ox.ac.uk/sites/default/files/BandMT_08.pdf>.*
Apparatus. (n.d.) American Heritage® Dictionary of the English Language, Fifth Edition. (2011). Retrieved Mar. 28 2018 from https://www.thefreedictionary.com/apparatus.*
Johnson, James "Selection of Materials for UV Optics", Dec. 1, 2008 (Year: 2008).*
International Search Report and Written Opinion dated Feb. 10, 2014 for PCT/US2013/071708, 14 pages.
Kumar et al., "Chemical Vapor Deposition of Carbon Nanotubes: A Review on Growth Mechanism and Mass Production," Journal of Nanoscience and Nanotechnology, 2010, vol. 10, pp. 3739-3758.
Duplock et al, Hallmark of Perfect Graphene, Physical Review Letters, Jun. 4, 2004, vol. 92, No. 22, pp. 225502-1-225502-4, The American Physical Society.
Frank et al, Mechanical properties of suspended graphene sheets, J Vac Sci Technol B 25(6), Nov./Dec. 2007, pp. 2558-2561, American Vacuum Society.
Lee et al, Measurement of the Elastic Properties and Intrinsic Strength of Monolayer Graphene, vol. 321, Jul. 18, 2008, pp. 385-388, Science.
Zong et al, Direct measurement of graphene adhesion on silicon surface by intercalation of nanoparticles, J. Appl. Phys, 107, 026104, 2010, 3 pgs.

* cited by examiner

*Primary Examiner* — Cheng Yuan Huang
(74) *Attorney, Agent, or Firm* — MH2 Technology Law Group LLP

(57) ABSTRACT

In one aspect, coated optical elements are described herein. In some implementations, a coated optical element comprises an optical element and a graphene coating layer disposed on a surface of the optical element. The graphene coating layer, in some implementations, has a thickness of about 100 nm or less.

20 Claims, 1 Drawing Sheet

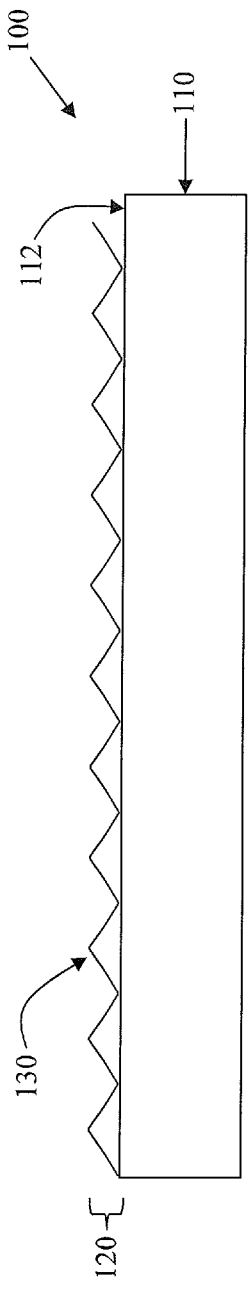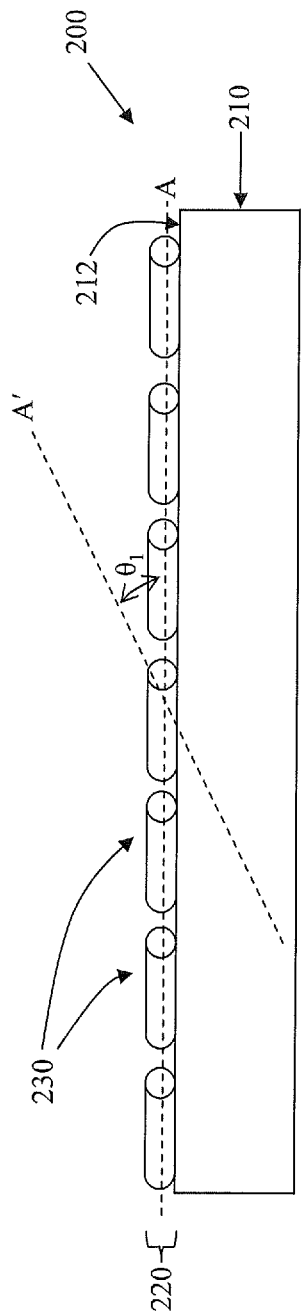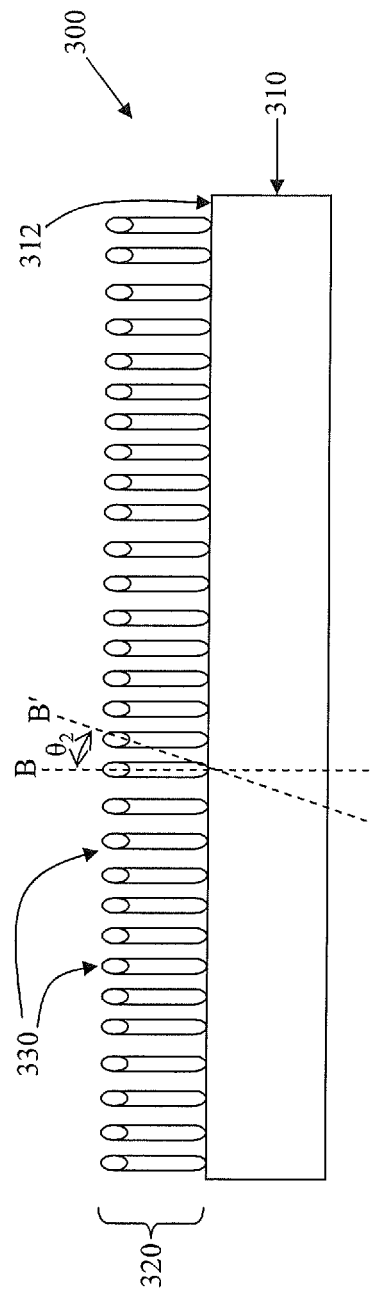

GRAPHENE COATED OPTICAL ELEMENTS

FIELD

This disclosure relates to coated optical elements, apparatus comprising coated optical elements, and methods of coating optical elements.

BACKGROUND

Optical elements are generally optimized for their optical characteristics, such as transparency or reflectivity in a desired spectral region. However, in many applications, an optical element may be exposed to mechanical stress. Therefore, some optical elements are coated with a material intended to provide improved mechanical performance, such as improved hardness. Unfortunately, the addition of a coating to an optical element can degrade the element's optical properties. Many coatings that provide a large improvement in mechanical performance also cause a large degradation in optical performance.

Therefore, there exists a need for coatings for optical elements that improve mechanical performance but do not significantly alter or degrade the optical properties of the underlying optical elements.

SUMMARY

In one aspect, coated optical elements are described herein which, in some implementations, may provide one or more advantages over previous coated optical elements. For example, in some implementations, a coated optical element described herein has increased absolute transparency and/or reduced Fresnel loss compared to prior coated optical elements. In other implementations, a coated optical element has improved hardness and/or a reduced thickness of the coating layer. Further, in some implementations, the coating of a coated optical element described herein exhibits chemical inertness. Therefore, in some implementations, a coated optical element described herein can exhibit improved mechanical and environmental performance without substantial alteration of the element's optical properties.

In some implementations, a coated optical element described herein comprises an optical element and a graphene coating layer disposed on a surface of the optical element. The graphene coating layer, in some implementations, has an average thickness of about 100 nm or less. In some implementations, a graphene coating layer described herein comprises one or more graphene sheets. In other implementations, a graphene coating layer comprises a layer of graphene tubes. Graphene tubes of a graphene coating layer described herein, in some implementations, can have a horizontal or substantially horizontal orientation. In other implementations, graphene tubes of a graphene coating layer described herein can have a vertical or substantially vertical orientation. Moreover, in some implementations, a coated optical element described herein exhibits one or more of a high optical transparency in the visible and/or ultraviolet (UV) regions of the electromagnetic spectrum, a low Fresnel loss, and a high hardness and/or bulk modulus.

In another aspect, apparatuses comprising a coated optical element are described herein which, in some implementations, may provide one or more advantages over prior apparatus. In some implementations, for example, an apparatus described herein can be used in harsh environmental conditions without the need to sequester or isolate the coated optical element of the apparatus in a protective housing such as an environmentally controlled housing. In some implementations, an apparatus described herein comprises a coated optical element comprising an optical element and a graphene coating layer disposed on a surface of the optical element, wherein the coated optical element is exposed to the external environment of the apparatus. In some implementations, for instance, the coated optical element is not enclosed in a protective housing.

In another aspect, methods of coating an optical element are described herein. In some implementations, a method of coating an optical element described herein comprises providing an optical element and disposing a graphene coating on a surface of the optical element. In some implementations, disposing the graphene coating is carried out using a vapor deposition method or an ablation method.

These and other implementations are described in greater detail in the detailed description which follows.

BRIEF DESCRIPTION OF THE FIGURES

FIG. 1 illustrates a side view of a coated optical element according to one implementation described herein.

FIG. 2 illustrates a side view of a coated optical element according to one implementation described herein.

FIG. 3 illustrates a side view of a coated optical element according to one implementation described herein.

DETAILED DESCRIPTION

Implementations described herein can be understood more readily by reference to the following detailed description, examples, and drawings. Elements, apparatus, and methods described herein, however, are not limited to the specific implementations presented in the detailed description, examples, and drawings. It should be recognized that these implementations are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

I. Coated Optical Elements

In one aspect, coated optical elements are described herein. In some implementations, a coated optical element comprises an optical element and a graphene coating layer disposed on a surface of the optical element. The graphene coating layer, in some implementations, provides improved mechanical performance to the optical element without substantially altering the element's optical properties. For example, in some implementations, a coated optical element described herein can have increased absolute transparency and/or reduced Fresnel loss compared to prior coated optical elements while also exhibiting improved hardness. Moreover, in some implementations, the coating layer of a coated optical element described herein has a reduced thickness compared to other coated optical elements.

Turning now to specific components of coated optical elements, a coated optical element described herein comprises a graphene coating layer. Any graphene coating layer not inconsistent with the objectives of the present disclosure may be used. For reference purposes herein, a "graphene"

coating layer includes $sp^2$-bonded carbon as a primary carbon component, as opposed to $sp^3$-bonded carbon. In some implementations, a graphene coating layer described herein comprises no $sp^3$-hybridized carbon or substantially no $sp^3$-hybridized carbon. For example, in some implementations, a graphene coating layer comprises less than about 10 atom percent or less than about 5 atom percent $sp^3$-hybridized carbon, relative to the total amount of carbon in the coating layer. In some implementations, a graphene coating layer comprises less than about 2 atom percent or less than about 1 atom percent $sp^3$-hybridized carbon. Moreover, a graphene coating layer described herein, in some implementations, does not comprise, consist, or consist essentially of diamond-like carbon (DLC).

In some implementations, a graphene coating layer comprises, consists, or consists essentially of one or more graphene sheets. A graphene sheet, in some implementations, comprises a single molecular or atomic layer having a flat planar structure. Any number of graphene sheets not inconsistent with the objectives of the present disclosure may be used. In some implementations, a graphene coating layer comprises a plurality of graphene sheets. The plurality of graphene sheets, in some implementations, can be arranged in a stacked or layered configuration. In other implementations, a graphene coating layer comprises or consists of a single graphene sheet. Therefore, in some implementations, a graphene coating layer described herein comprises 1 or more atomic layers of graphene. In some implementations, a graphene coating layer comprises between 1 and 10 atomic layers of graphene. In some implementations, a graphene coating layer comprises between 1 and 5 atomic layers or between 1 and 3 atomic layers of graphene. In some implementations, a graphene coating layer comprises 1 atomic layer of graphene.

FIG. 1 illustrates a side view of a coated optical element comprising a graphene coating layer comprising a graphene sheet. As understood by one of ordinary skill in the art, the various elements depicted in FIG. 1 are representational only and are not necessarily drawn to scale. In the implementation of FIG. 1, a coated optical element (100) comprises an optical element (110) and a graphene coating layer (120) disposed on a surface (112) of the optical element (110). Graphene coating layer (120) comprises a graphene sheet (130). Graphene sheet (130) is depicted schematically in FIG. 1 by a line resembling an alkane chain. However, as understood by one of ordinary skill in the art, such a depiction is for illustration purposes only. In addition, optical element (110) is depicted schematically in FIG. 1 as having a rectangular cross section and a flat planar surface. However, other implementations are also possible. For example, in some implementations, an optical element can have a circular, elliptical, or other cross sectional shape. Any size and shape not inconsistent with the objectives of the present disclosure may be used. Similarly, in some implementations, the surface (112) of the optical element (110) can have a curvature, including a convex curvature, a concave curvature, or a periodic or undulating curvature.

In other implementations, a graphene coating layer described herein comprises, consists, or consists essentially of a layer of graphene tubes. Any graphene tubes not inconsistent with the objectives of the present disclosure may be used. In some implementations, graphene tubes comprise carbon nanotubes (CNTs) such as single-walled carbon nanotubes (SWNTs) or multi-walled carbon nanotubes (MWNTs). Morover, graphene tubes can have any size not inconsistent with the objectives of the present disclosure. For example, in some implementations, graphene tubes have a size in at least one dimension of less than about 300 nm or less than about 100 nm. In some implementations, graphene tubes have a size in at least one dimension between about 1 nm and about 200 nm, between about 1 nm and about 150 nm, or between about 5 nm and about 100 nm. In some implementations, graphene tubes have a size in at least one dimension between about 5 nm and about 75 nm or between about 15 nm and about 60 nm. In some implementations, graphene tubes have a size in at least one dimension between about 20 nm and about 30 nm or between about 45 nm and about 55 nm. In some implementations, graphene tubes have a size in at least two dimensions of less than about 300 nm or less than about 100 nm. In some implementations, graphene tubes have a size in at least two dimensions between about 1 nm and about 200 nm, between about 1 nm and about 150 nm, or between about 5 nm and about 100 nm. In some implementations, graphene tubes have a size in at least two dimensions between about 5 nm and about 75 nm or between about 15 nm and about 60 nm.

Moreover, in some implementations, graphene tubes of a graphene coating layer have a low aspect ratio. In some implementations, graphene tubes have an aspect ratio of about 20 or less or about 10 or less. In some implementations, graphene tubes have an aspect ratio between about 2 and about 15 or between about 3 and about 10. In addition, graphene tubes having an aspect ratio of about 20 or less, in some implementations, have a length ranging from about 5 nm to about 200 nm or from about 10 nm to about 100 nm.

Further, the graphene tubes of a graphene coating layer described herein, in some implementations, can be oriented in the layer. In some implementations, one or more graphene tubes can be oriented horizontally or substantially horizontally in the layer. In other implementations, one or more graphene tubes can be oriented vertically or substantially vertically in the layer. Moreover, in some implementations, vertically or substantially vertically oriented graphene tubes in a layer are aligned or substantially aligned with one another, including in an array.

FIGS. 2 and 3 each illustrate a graphene coating layer comprising a layer of graphene tubes according to some implementations described herein. With reference to FIG. 2, a coated optical element (200) comprises an optical element (210) and a graphene coating layer (220) disposed on a surface (212) of the optical element (210). In the implementation of FIG. 2, the graphene coating layer (220) of coated optical element (200) comprises a plurality of graphene tubes (230) oriented horizontally or substantially horizontally on the surface (212) of the optical element (210). Horizontal orientation is relative to the surface (212). For reference purposes herein, a "horizontal" orientation comprises an orientation wherein the long axis of a graphene tube (230) is oriented parallel to the surface (212). In the implementation of FIG. 2, all of the graphene tubes (230) are depicted as having a long axis oriented parallel to the surface (212). However, other arrangements are possible. For example, in some implementations, one or more graphene tubes can have a long axis along line A' in FIG. 2 or along some other direction that is not parallel to the surface (212). For reference purposes herein, a "substantially horizontal" orientation comprises an orientation wherein the long axis (A') of a graphene tube forms an angle ($\theta_1$) of less than about 45 degrees with a line (A) parallel to the surface (212) of the optical element (210). In some implementations, the angle ($\theta_1$) is less than about 30 degrees or less than about 15 degrees. In some implementations, the angle ($\theta_1$) is between about 0 degrees and about 30 degrees. In some implementations, a majority of the graphene tubes of a graphene coating layer described herein have a horizontal or substantially horizontal orientation. Further, in some implementations, at least about 60 percent, at least about 70 percent, at least about 80 percent, or at least about 90 percent of the graphene tubes of a graphene coating layer have a horizontal or substantially horizontal orientation.

In other implementations, the graphene tubes of a graphene coating layer can be oriented vertically or substantially vertically. For example, with reference to FIG. 3, a coated optical element (300) comprises an optical element (310) and a graphene coating layer (320) disposed on a surface (312) of the optical element (310). In the implementation of FIG. 3, the graphene coating layer (320) of coated optical element (300) comprises a plurality of graphene tubes (330) oriented vertically or substantially vertically on the surface (312) of the optical element (310). Vertical orientation is relative to the surface (312). For reference purposes herein, a "vertical orientation" comprises an orientation wherein the long axis of a graphene tube (330) is oriented perpendicular to the surface (312). In the implementation of FIG. 3, all of the graphene tubes (330) are depicted as having a long axis oriented perpendicular to the surface (312). However, other arrangements are possible. For example, in some implementations, one or more graphene tubes can have a long axis along line B' in FIG. 3 or along some other direction that is not parallel to the surface (312). A "substantially vertical" orientation, for reference purposes herein, comprises an orientation wherein the long axis (B') of a graphene tube forms an angle ($\theta_2$) of less than about 45 degrees with a line (B) perpendicular to the surface of the optical element. In some implementations, the angle ($\theta_2$) is less than about 30 degrees or less than about 15 degrees. In some implementations, the angle ($\theta_2$) is between about 0 degrees and about 30 degrees. In some implementations, a majority of the graphene tubes of a graphene coating layer described herein have a vertical or substantially vertical orientation. Further, in some implementations described herein, at least about 60 percent, at least about 70 percent, at least about 80 percent, or at least about 90 percent of the graphene tubes of a graphene coating layer have a vertical or substantially vertical orientation.

In addition, in some implementations, a graphene coating layer described herein comprises, consists, or consists essentially of a monolayer of graphene tubes, including a monolayer of horizontally or substantially horizontally oriented graphene tubes or a monolayer of vertically of substantially vertically oriented graphene tubes.

Moreover, a graphene coating layer described herein can have any thickness not inconsistent with the objectives of the present disclosure. In some implementations, for example, a graphene coating layer has an average thickness of about 300 nm or less or about 200 nm or less. In some implementations, a graphene coating layer has an average thickness of about 100 nm or less. In some implementations, a graphene coating layer has a thickness of about 50 nm or less, about 10 nm or less, or about 5 nm or less. In some implementations, a graphene coating layer has a thickness of about 3 nm or less, about 2 nm or less, or about 1 nm or less. In some implementations, a graphene coating layer described herein has an average thickness greater than about 100 nm.

Further, in some implementations wherein a graphene coating layer described herein comprises a layer of graphene tubes, the average thickness of the coating layer is no greater than about 50 times the average diameter of the graphene tubes. In some implementations, the average thickness of the coating layer is no greater than about 20 times or no greater than about 10 times the average diameter of the graphene tubes. In some implementations, the average thickness of the coating layer is no greater than about 5 times, no greater than about 3 times, or no greater than about 2 times the average diameter of the graphene tubes. In other implementations, the average thickness of the coating layer is no greater than about 3 times the average length of the graphene tubes. In some implementations, the average thickness of the coating layer is no greater than about 2 times, no greater than about 1.5 times, or no greater than about 1 times the average length of the graphene tubes.

In addition, the graphene coating layer of a coated optical element described herein is disposed on a surface of an optical element. In some implementations, the graphene coating layer is disposed directly on the surface of the optical element. Moreover, in some implementations, the graphene coating layer is bonded or adhered to the surface of the optical element. The bonding, in some implementations, comprises chemical bonding. In some implementations, bonding comprises physical bonding. Bonding, in some implementations, comprises or consists of one or more of covalent bonding, ionic bonding, hydrogen bonding, electrostatic interactions, and van der Waals interactions. In some implementations, for instance, bonding comprises or consists of van der Waals interactions. In some implementations, a graphene coating layer described herein is bonded or adhered to a surface of an optical element with an adhesion energy of at least about 75 mJ/m² or at least about 100 mJ/m², when measured by scanning electron microscopy (SEM) according to the method of Zong et al., "Direct measurement of graphene adhesion on silicon surface by intercalation of nanoparticles," *J. Appl. Phys.*, volume 107, page 026104-1 to 026104-3 (2007). Specifically, the adhesion energy ($\gamma$) is given by equation (1):

$$\gamma = \lambda E h(w/a)^4 \quad (1),$$

where $\lambda$ is a geometrical factor equal to 1/16, E is 0.5 TPa, h is the thickness of the graphene coating layer, w is a central blister displacement equal to the diameter of an intercalated nanoparticle, and a is a blister radius measured by SEM. The blister is provided by disposing a so-called wedge particle or intercalated nanoparticle between the coating layer and the substrate, as taught by Zong et al. The wedge particle can comprise any suitable particle not inconsistent with the objectives of the present disclosure. In some implementations, for instance, the wedge particle comprises a gold or silver nanoparticle having a diameter between about 10 nm and about 100 nm, the wedge particle being disposed between the optical element and the coating layer for measurement purposes. In some implementations, a graphene coating layer is bonded or adhered to a surface of an optical element with an adhesion energy of at least about 150 mJ/m² when measured as described herein. In some implementations, a graphene coating layer is bonded or adhered to a surface of an optical element with an adhesion energy between about 50 mJ/m² and about 300 mJ/m² or between about 100 mJ/m² and about 200 mJ/m². In some implementations, a graphene coating layer described herein resists delamination or other detachment from the optical element over time, including when exposed to adverse environmental conditions, such as extreme temperatures, high humidity, dust, or electromagnetic radiation exposure, or when exposed to variations or cycles of exposure to such conditions. Further, in some implementations, a graphene coating layer described herein is continuous or substantially continuous across the entire surface of the optical element.

Any optical element not inconsistent with the objectives of the present disclosure can be used. In some implementations, an optical element comprises a lens, window, substrate, or display cover. In some implementations, an optical element comprises a grating. In some implementations, an optical element comprises an organic light emitting diode (OLED) or a liquid crystal display. Moreover, in some implementations, an optical element comprises or is formed from an inorganic material such as an inorganic oxide or inorganic glass. In some implementations, an optical element is formed from an aluminum oxide, such as sapphire. In some implementations, an optical element is formed from silica or quartz, including fused quartz. In some implementations, an optical element is formed from one or more of BK7 optical glass, SUPRASIL, and INFRASIL.

Further, a coated optical element described herein, in some implementations, can exhibit one or more desired properties. In some implementations, for instance, a coated optical element exhibits a high optical transparency, including in the visible region of the electromagnetic spectrum. For reference purposes herein, optical transparency is relative to the total amount of incident radiation in a given wavelength range. Optical transparency can be measured with a broad spectral source or a narrow spectral source. Moreover, optical transparency of an element can be measured in any manner not inconsistent with the objectives of the present disclosure, including with any suitable instrumentation. For example, in some implementations, optical transparency is measured with a spectrometer such as a BECKMAN spectrometer.

In some implementations, a coated optical element described herein exhibits an optical transparency of at least about 90 percent or at least about 95 percent between about 350 nm and about 750 nm. In some implementations, a coated optical element exhibits a transparency of at least about 98 percent between about 350 nm and about 750 nm. In some implementations, a coated optical element exhibits a transparency of at least about 99.9 percent or at least about 99.99 percent between about 350 nm and about 750 nm. In some implementations, a coated optical element exhibits an optical transparency of between about 90 percent and about 99.99 percent or between about 95 percent and about 98 percent at wavelengths between about 350 nm and about 750 nm. Moreover, in some implementations, a coated optical element described herein exhibits an optical transparency of about 85 percent to about 99.99 percent or about 90 percent to about 95 percent at wavelengths between about 200 nm and about 800 nm or between about 220 nm and about 350 nm.

In addition, in some implementations, the optical transparency of a coated optical element described herein is at least about 90 percent, at least about 95 percent, or at least about 99 percent of the optical transparency of the uncoated optical element in a given wavelength range, such as between about 350 nm and about 750 nm or between about 220 nm and about 350 nm. In some implementations, the optical transparency of a coated optical element is between about 85 percent and about 99.99 percent, or between about 95 percent and about 98 percent of the optical transparency of the uncoated optical element.

Further, in some implementations, a coated optical element described herein exhibits low Fresnel reflection loss. For reference purposes herein, Fresnel reflection loss refers to the amount of incident light reflected by an element. In some implementations, a coated optical element described herein exhibits a Fresnel loss of less than about 3 percent. In some implementations, a coated optical element exhibits a Fresnel loss of less than about 2 percent or less than about 1 percent. In some implementations, a coated optical element exhibits a Fresnel loss of less than about 0.1 percent. In addition, in some implementations, the Fresnel loss of a coated optical element described herein is within about 10 percent or less of the Fresnel loss of the uncoated optical element in a given wavelength range, such as between about 350 nm and about 750 nm or between about 220 nm and about 350 nm. In some implementations, the Fresnel loss of a coated optical element is within about 5 percent or less or about 1 percent or less of the uncoated optical element. In some implementations, the Fresnel loss of a coated optical element is within about 0.5 percent or less or about 0.1 percent or less of the Fresnel loss of the uncoated optical element.

Moreover, in some implementations, a coated optical element described herein exhibits a high mechanical hardness, stiffness, or resistance to compression. In some implementations, for instance, a graphene coating layer of a coated optical element described herein exhibits a tensile modulus of up to about 2 TPa or up to about 1 TPa, when measured by nanoindentation in an atomic force microscope (AFM) according to the method described in Lee et al., "Measurement of the Elastic Properties and Intrinsic Strength of Monolayer Graphene," Science, volume 321, number 5887, pages 385-388 (18 Jul. 2008). Specifically, the tensile modulus is determined by fitting to equation (2):

$$F = \sigma_0(\pi a)(\iota/a) + E(q^3 a)(\delta/a)^3 \qquad (2),$$

where F is applied force, $\sigma_0$ is the pretension in the coating layer, a is the membrane diameter, S is the deflection at the center point, E is the tensile modulus, and q is a dimensionless constant equal to 1.02. For measurement purposes, a graphene coating layer is disposed on an optical element having a plurality of circular wells (diameter of about 1 μm to 1.5 μm, depth of about 500 nm). The coating layer deposited over the wells can form a series of free-standing membranes. Mechanical properties are measured by indenting the center of each free-standing membrane with an AFM, as taught by Lee et al. In some implementations, a coated optical element exhibits a tensile modulus of up to about 500 GPa or up to about 100 GPa when measured by nanoindentation as described herein. In some implementations, a coated optical element exhibits a tensile modulus of up to about 50 GPa or up to about 30 GPa. In some implementations, a coated optical element described herein exhibits a tensile modulus of between about 1 GPa and about 1 TPa or between about 500 GPa and about 1 TPa, when measured by nanoindentation in an atomic force microscope, such as described above. In some implementations, a coated optical element exhibits a tensile modulus of between about 10 GPa and about 30 GPa.

Further, in some implementations, a coated optical element described herein can exhibit a combination of properties described herein, including a combination of optical and mechanical properties. A coated optical element described herein can exhibit any combination of properties and features not inconsistent with the objectives of the present disclosure. For example, in some implementations, a coated optical element has one or more the following features:

(1) an optical transparency between about 85 percent and about 99.99 percent at wavelengths between about 200 nm and about 800 nm, (2) a Fresnel loss of less than about 3 percent, (3) a hardness between about 1 GPa and about 1 TPa or between about 500 GPa and about 1 TPa, when measured by nanoindentation, as described above, (4) an adhesion energy of at least about 75 mJ/m² or at least about 100 mJ/m², when measured as described above, and (5) a graphene coating layer having a thickness of less than about 100 nm or less than about 10 nm.

In some implementations, a coated optical element described herein exhibits two or more or three or more of the foregoing features. In some implementations, a coated optical element described herein exhibits four or more of the foregoing features. Thus, in some implementations, a thin graphene coating layer described herein can provide improved mechanical performance without substantial alteration or degradation of optical properties. Moreover, in some implementations, a coated optical element described herein can maintain desirable performance features when exposed to adverse environmental conditions.

II. Apparatus Comprising a Coated Optical Element

In another aspect, apparatuses are described herein. In some implementations, an apparatus comprises a coated optical element comprising an optical element and a graphene coating layer disposed on a surface of the optical element, wherein the coated optical element is exposed to the external environment of the apparatus. Further, in some implementations, the coated optical element of the apparatus is not enclosed in a protective housing such as an environmentally controlled housing. A coated optical element of an apparatus described herein can comprise any coated optical element described in Section I hereinabove.

III. Methods of Coating an Optical Element

In yet another aspect, methods of coating an optical element are described herein. In some implementations, a method of coating an optical element comprises providing an optical element and disposing a graphene coating on a surface of the optical element to provide a graphene coating layer.

Turning now to specific steps of methods, methods of coating an optical element described herein comprise providing an optical element. Any optical element not inconsistent with the objectives of the present disclosure may be used. In some implementations, the optical element comprises an optical element described hereinabove in Section I. For example, in some implementations, an optical element comprises a lens, window, substrate, display cover, or grating formed from an inorganic material such as an inorganic glass. In some implementations, an optical element is formed from silica or quartz.

Methods of coating an optical element described herein also comprise disposing a graphene coating on a surface of the optical element to provide a graphene coating layer. The graphene coating can be disposed on the surface of the optical element in any manner not inconsistent with the objectives of the present disclosure. In some implementations, for example, disposing a graphene coating is carried out using vapor deposition. Vapor deposition, in some implementations, comprises chemical vapor deposition (CVD). For example, in some implementations, CVD can be used to provide a graphene coating layer comprising one or more graphene sheets. Any CVD method not inconsistent with the objectives of the present disclosure may be used. For example, in some implementations, one or more of atmospheric pressure CVD, ultrahigh vacuum CVD, or hot filament (or hot wire or catalytic) CVD can be used. In some implementations, a CVD method comprises disposing a graphene coating from one or more carbon-containing gas-phase reactants. In some implementations, a gas-phase reactant comprises a hydrocarbon. In some implementations, a gas-phase reactant comprises benzene, ethane, methane, or a combination or mixture thereof. Further, in some implementations, a gas-phase reactant is provided in a carrier gas such as $H_2$.

In other implementations, disposing a graphene coating is carried out using catalytic vapor phase deposition. For instance, in some implementations, catalytic vapor deposition can be used to provide a graphene coating layer comprising a layer of graphene tubes having a vertical or substantially vertical orientation described herein. Any catalytic vapor phase deposition method not inconsistent with the objectives of the present disclosure may be used. In some implementations, a catalytic vapor phase deposition method comprises disposing metal catalyst particles on a surface of an optical element. The metal catalyst particles, in some implementations, can be disposed on the optical element in an array, such as an ordered array of equally spaced particles. Further, the metal catalyst particles can have any size and chemical composition not inconsistent with the objectives of the present disclosure. Moreover, the size of the metal catalyst particles, in some implementations, is selected to obtain a desired graphene tube diameter. In some implementations, for example, the metal catalyst particles have an average diameter ranging from about 1 nm to about 20 nm or about 1 nm to about 10 nm. In some implementations, the metal catalyst particles have an average diameter of less than about 1 nm. Further, in some implementations, the metal catalyst particles comprise one or more transition metals, including pure metals, metal alloys, or mixtures of metals. In some implementations, the metal catalyst particles comprise nickel particles. In other implementations, the metal catalyst particles comprise a noble metal such as gold or silver.

In addition, in some implementations, a catalytic vapor phase deposition method described herein further comprises disposing the optical element in a vacuum chamber and heating the optical element. An optical element comprising a layer of metal catalyst particles can be heated in the vacuum chamber to any temperature not inconsistent with the objectives of the present disclosure. In some implementations, the optical element is heated to a temperature between about 600° C. and about 800° C. In some implementations, the optical element is heated to a temperature of about 700° C.

In some implementations, a catalytic vapor phase deposition method further comprises introducing one or more gases into the vacuum chamber, wherein at least one gas comprises a carbon-containing species. In some implementations, a carbon-containing gas such as acetylene or ethylene is introduced with a process gas such as ammonia or nitrogen. In this manner, in some implementations, a layer of graphene tubes can be grown on the metal catalyst particles disposed on the optical element.

In other implementations, disposing a graphene coating is carried out using laser ablation. Any laser ablation method not inconsistent with the objectives of the present disclosure may be used. In some implementations, a laser ablation method comprises disposing a graphite target and an optical element in a high-temperature reaction chamber and exposing the graphite target to a pulsed laser beam to vaporize at least a portion of the target. In some implementations, a laser ablation method further comprises providing one or more inert gases in the reaction chamber. Providing one or more inert gases, in some implementations, comprises flowing the inert gases through the reaction chamber. Moreover, in some implementations described herein, a surface of the optical element within the reaction chamber is cooler than the ablation temperature, so that vaporized carbon condenses on the surface of the optical element. In some implementations, the condensed carbon forms graphene tubes on the surface of the optical element. Further, in some implementations, a method described herein further comprises applying an electrical field or voltage to the optical element during condensation to provide a preferred growth direction of the graphene tubes. In this manner, in some implementations, a coated optical element can be provided, wherein the coated optical element comprises a graphene coating layer comprising graphene tubes, including graphene tubes having a preferred orientation. In some implementations, the graphene tubes are horizontally or substantially horizontally oriented.

A graphene coating layer provided by a method described herein can have any property of a graphene coating layer described hereinabove in Section I. For instance, in some implementations, a graphene coating layer produced by a method described herein has a thickness of about 100 nm or less. Moreover, the thickness of a graphene coating layer described herein, in some implementations, can be selected by varying one or more parameters during deposition of the coating layer on an optical element. For example, in some implementations, the thickness of the coating layer is selected by varying the deposition time, where a shorter deposition time provides a thinner coating layer. Further, a deposition time, in some implementations, can be selected using information obtained from a microbalance (such as a quartz crystal microbalance) arranged to determine the mass of material deposited on an optical element. In some implementations, the information is obtained in real-time by providing information regarding the output of the microbalance (e.g., a measured mass change of an optical element) to the deposition apparatus such as a chemical vapor deposition system, thereby forming a feedback loop.

Some implementations described herein are further illustrated in the following non-limiting examples.

EXAMPLE 1

Graphene Coated Optical Element

A graphene coated optical element is prepared as follows. An optical element formed from silica is cleaned by soaking in KOH followed by rinsing and ultrasound cleaning with distilled water. A graphene coating layer comprising a flat planar graphene sheet is applied to a surface of the cleaned optical element by disposing the optical element in a CVD chamber and exposing the optical element to CVD deposition conditions. Specifically, the deposition is carried out at 500° C. for approximately 100 minutes in an atmosphere of 100 Torr partial pressure benzene, ethane or methane and 1 Torr partial pressure $H_2$, at a total pressure of approximately 101 Torr. The thickness of the resulting graphene coating layer is approximately 100 nm. As described hereinabove, a thinner graphene coating layer can be obtained by reducing the deposition time. Further, the deposition time can be selected using information obtained from a microbalance disposed in the chamber and arranged to determine the mass of material deposited on the optical element as described hereinabove.

EXAMPLE 2

Graphene Coated Optical Element

A graphene coated optical element is prepared as follows. An optical element formed from silica is cleaned by soaking in KOH followed by rinsing and ultrasound cleaning with distilled water. A graphene coating layer comprising vertically or substantially vertically oriented single-walled carbon nanotubes (SWNTs) is applied to a surface of the cleaned optical element by disposing the optical element in a CVD chamber and exposing the optical element to catalytic vapor deposition conditions. Specifically, the deposition is carried out at an optical element temperature of about 700° C. for approximately 100 minutes in an atmosphere of 100 Torr partial pressure acetylene or ethylene and 5 Torr partial pressure $N_2$ or $NH_3$, at a total pressure of approximately 105 Torr. An array of nickel particles having a diameter of about 10 nm is disposed on the optical element for the catalytic formation of the SWNTs. The resulting SWNTs are aligned and have an average diameter of about 10 nm and an average length of about 100 nm. The average thickness of the graphene coating layer is approximately 20 nm.

EXAMPLE 3

Graphene Coated Optical Element

A graphene coated optical element is prepared as follows. An optical element formed from silica is cleaned by soaking in KOH followed by rinsing and ultrasound cleaning with distilled water. A graphene coating layer comprising horizontally or substantially horizontally oriented single-walled carbon nanotubes (SWNTs) is applied to a surface of the cleaned optical element by disposing the optical element in a laser ablation reaction chamber and exposing the optical element to laser ablation deposition conditions. Specifically, the laser ablation is carried out using a graphite target and a Q-switched laser having a pulse energy of 10 mJ and a pulse width of 10 ns. The optical element is maintained at a temperature of about 50° C. Laser ablation is carried out for approximately 100 minutes in an inert atmosphere of 0.1 Torr. A voltage of 5-50 V is applied laterally across the surface of the optical element. The resulting carbon nanotubes, which are horizontally or substantially horizontally oriented, have an average diameter of about 5 nm and an average length of about 50 nm. The average thickness of the graphene coating layer is approximately 100 nm.

Various implementations of the disclosure have been described in fulfillment of the various objectives of the disclosure. It should be recognized that these implementations are merely illustrative of the principles of the present disclosure. Numerous modifications and adaptations thereof will be readily apparent to those skilled in the art without departing from the spirit and scope of the disclosure.

That which is claimed is:
1. A coated optical element comprising:
an optical element comprising UV grade fused silica; and
a graphene coating layer disposed on a surface of the optical element,
wherein the graphene coating layer comprises a layer of graphene tubes, wherein the graphene tubes have a horizontal orientation,
wherein the average thickness of the graphene coating layer is from about three to about five times the average diameter of the graphene tubes, and no greater than about three times the average length of the graphene tubes, and
wherein the coated optical element exhibits an optical transparency between about 85 percent to about 99.99 percent at all wavelengths between about 200 nm and about 800 nm.

2. The coated optical element of claim 1, wherein the layer of graphene tubes further comprises graphene tubes having a vertical or substantially vertical orientation.

3. The coated optical element of claim 1, wherein the coated optical element exhibits a Fresnel loss of less than about 3 percent.

4. The coated optical element of claim 1, wherein the coated optical element exhibits a tensile modulus between about 1 GPa and about 1 TPa when measured by nanoindentation in an atomic force microscope.

5. The coated optical element of claim 1, wherein the coated optical element exhibits an optical transparency of between about 95 percent and about 99.99 percent at all wavelengths between about 200 nm and about 800 nm, a Fresnel loss of less than about 3 percent, and a hardness between about 1 GPa and about 1 TPa.

6. The coated optical element of claim 1, further comprising an array of metal catalyst particles disposed on the optical element.

7. The coated optical element of claim 6, wherein the metal catalyst particles have an average diameter of from about 1 nm to about 20 nm.

8. The coated optical element of claim 1, wherein some of the graphene tubes have a horizontal orientation, and wherein some other ones of the graphene tubes have a vertical or substantially vertical orientation.

9. The coated optical element of claim 8, wherein a majority of the graphene tubes of the graphene coating layer have a vertical or substantially vertical orientation.

10. The coated optical element of claim 8, wherein a majority of the graphene tubes of the graphene coating layer have a horizontal orientation.

11. The coated optical element of claim 1, wherein the graphene coating layer consists essentially of a monolayer of horizontally oriented graphene tubes.

12. The coated optical element of claim 1, wherein the optical element comprises a lens, a window, a substrate, a display cover, a grating, an organic light emitting diode (OLED), or a liquid crystal display.

13. The coated optical element of claim 1, wherein the graphene tubes having the horizontal orientation comprise single walled carbon nanotubes.

14. The coated optical element of claim 1, wherein the graphene tubes having the horizontal orientation comprise multi-walled carbon nanotubes.

15. The coated optical element of claim 1, wherein the graphene tubes having the horizontal orientation comprise a size in at least one dimension of less than about 300 nm.

16. The coated optical element of claim 1, wherein the graphene tubes having the horizontal orientation comprise a size in at least two dimensions of less than about 300 nm.

17. The coated optical element of claim 1, wherein the graphene tubes having the horizontal orientation comprise a size in at least one dimension between about 1 nm and about 150 nm.

18. The coated optical element of claim 1, wherein the graphene tubes having the horizontal orientation comprise a size in at least two dimensions between about 1 nm and about 200 nm.

19. The coated optical element of claim 1, wherein the graphene tubes having the horizontal orientation comprise an aspect ratio of between about 2 and 15.

20. The coated optical element of claim 1, wherein the graphene tubes having the horizontal orientation comprise a length from about 5 nm to about 200 nm.

* * * * *